United States Patent [19]

Lerman

[11] Patent Number: 4,764,329
[45] Date of Patent: Aug. 16, 1988

[54] PRODUCING EXPLOSIVE MATERIAL IN GRANULAR FORM

[75] Inventor: Russell E. Lerman, Jefferson, N.J.

[73] Assignee: The United States of American as represented by the Secretary of the Army, Washington, D.C.

[21] Appl. No.: 66,589

[22] Filed: Jun. 12, 1987

[51] Int. Cl.$^4$ .............................................. C06B 21/00
[52] U.S. Cl. ....................................... 264/3.5; 264/3.1; 264/3.6; 264/8; 264/12
[58] Field of Search .................... 264/3.1, 3.4, 3.5, 3.6, 264/8, 12

[56] References Cited

U.S. PATENT DOCUMENTS

| | | | |
|---|---|---|---|
| 2,938,233 | 5/1960 | Nack et al. | 264/3.5 X |
| 3,070,837 | 1/1963 | Loertscher et al. | 264/3.5 X |
| 3,120,026 | 2/1964 | Russell et al. | 264/3.5 X |
| 3,419,644 | 12/1968 | Edman et al. | 264/3.1 |
| 3,420,137 | 1/1969 | Staba et al. | 264/3.1 X |
| 3,891,730 | 6/1975 | Wessel et al. | 264/12 X |
| 4,435,342 | 3/1984 | Wentzell | 264/8 |
| 4,444,606 | 4/1984 | Bertrand et al. | 264/3.4 X |
| 4,544,404 | 10/1985 | Yolton et al. | 264/12 X |

Primary Examiner—Peter A. Nelson
Attorney, Agent, or Firm—Robert P. Gibson; Edward Goldberg; Edward F. Costigan

[57] ABSTRACT

In mass production of explosive warheads, heat-meltable explosive material is continuously converted from an amorphous mass into small solid granules by directing melted exposive in a thin continuous stream against the upper inside surface of a rotating, generally bell-shaped vertically symmetrical element. Gravity and centrifugal force move the explosive downwardly on the said surface until it is flung off the bottom rim of the rotating bell element as small droplets. The droplets free-fall inside a surrounding cold air chamber which congeals them into solid granules of the explosive material which can then be loaded into the warheads. In another aspect of the invention, an explosive soluble in warm water, e.g., nitroguanidine, is provided in a continuous warm water solution flow to the inside surface of the rotating bell-shaped element to generate free-falling solution droplets from its lower rim. As the droplets cool in free-fall through air, they cool and precipitate out the dissolved explosive as granules that are separated from the cool solvent.

6 Claims, 1 Drawing Sheet

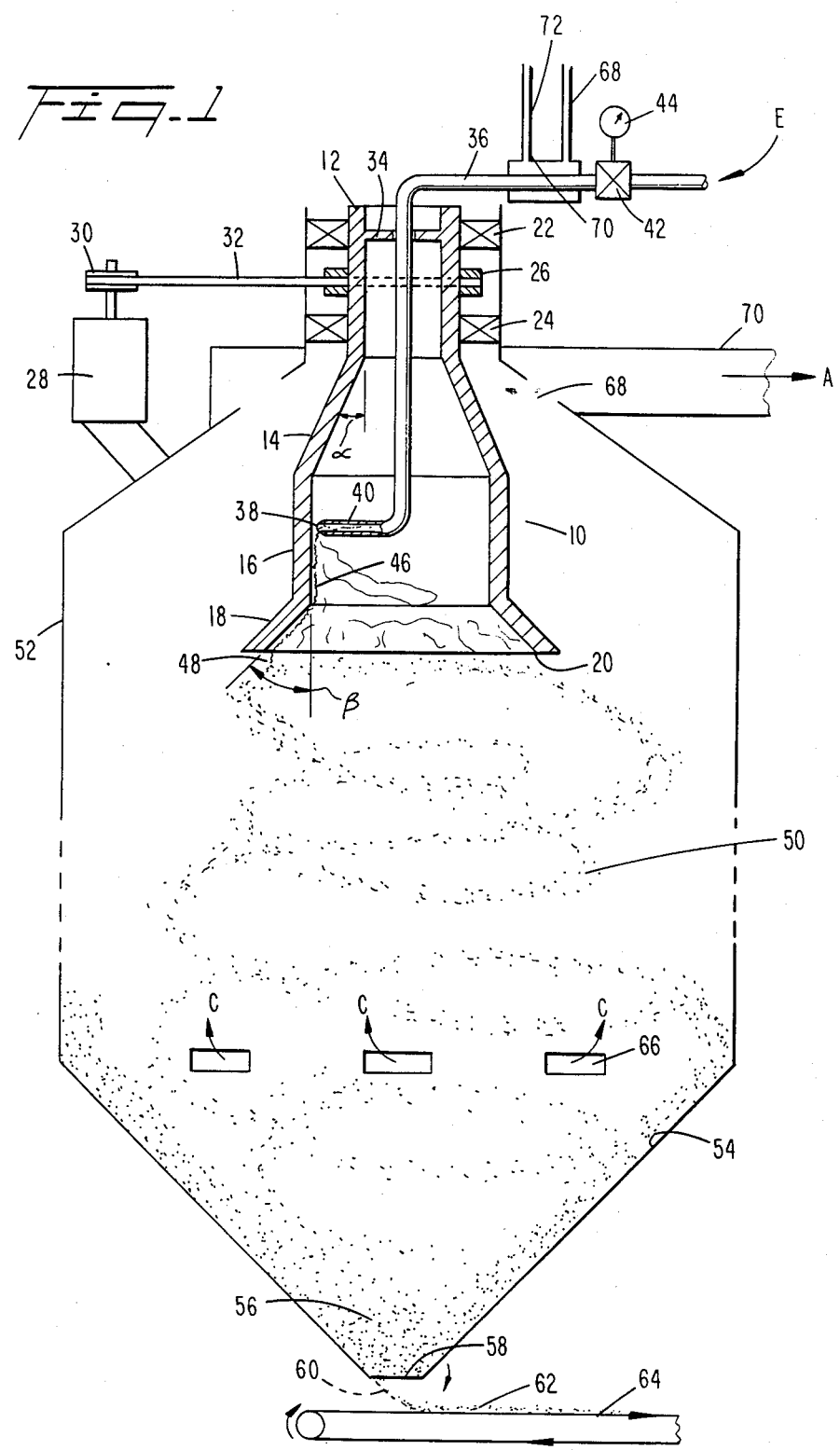

PRODUCING EXPLOSIVE MATERIAL IN GRANULAR FORM

GOVERNMENTAL INTEREST

The invention described herein may be manufactured, used and licensed by and for the Government for Governmental purpose without the payment to me of any royalties thereon.

TECHNICAL FIELD

This invention relates to methods and apparatus for the continuous production of explosive material in granular form and, more particularly, to such methods and apparatus adaptable to provide control over the granule size of the explosive product.

HISTORY OF THE PRIOR ART

Various explosive materials, including but not limited to trinitrotoluene (TNT), Cyclotol, Composition B and nitroguanidine, are generally produced in bulk quantities but are best utilized, for ordnance purposes in granular form. Depending on the specific use at hand, it is important that the granules of explosive be of predictable and controlled size.

One method now used to form TNT-based explosive material in granule form, known as the water slurry process is used to produce Granular Composition B (GCB). The GCB granules are separated from the water, dried, and then press loaded into munitions items. This process, however, produces a pollutant known as "red water", i.e., water that still contains substantial quantities of the explosive material. Disposal of this pollutant, where substantial production of GCB is comtemplated, is a very serious problem. A somewhat similar water slurry method is used to produce spheroidal nitroguanidine (SNQ) which is a non TNT-based explosive. However, the granules produced by both of these water slurry processes contain appreciable amounts of nonspheroidal material that tends to lower the quality of the final product. Therefore, the above process is not considered to be an effective way to supply GCB or SNQ during a high demand period.

As may be seen, a need exists for apparatus, and methods for using the same, to produce granules of a variety of explosive materials within carefully controllable size ranges.

SUMMARY OF THE INVENTION

Accordingly it is an object of this invention to provide apparatus for converting a heat-meltable explosive safely and economically into its granular form, with controllable granule size.

It is another object of this invention to provide apparatus to convert a liquid soluble explosive such as nitroguanidine safely and economically into its granular form, with controllable granule size.

It is a related object of this invention to provide a method for the conversion of substantial quantities of a heat-meltable explosive material in a continuous process into granules of controllable size.

It is an even further object of this invention to provide a method for the conversion of a liquid soluble explosive such as nitroguanidine in a continuous process into granules of controllable size.

These and other objects are realized in a preferred embodiment of this invention by providing heated, free-flowing molten explosive at a controlled rate to the inside of a verticaly oriented, axially-symmetric, rotating, generally bell-shaped cylindrical member which flares out to a lower rim to generate a spray of small molten explosive material droplets that congeal during free fall through air into granules of controllable size. In a related aspect of this invention, a water soluble explosive material such as nitroguanidine is dissolved in warm water, and the solution is provided to the inside surface of a vertically oriented, axially-symmetric, rotating, generally bell-shaped member which flares out to a lower rim to generate a warm solution spray of droplets which cool by free fall through air and precipitate out the explosive material as small granules of controllable size. Methods corresponding to use of the apparatus of this invention for converting either heat-meltable or water-soluble explosive material into granules of controlled size include the steps of controlling operational parameters such as temperature of the molten or dissolved explosive, flow rate of the explosive, rotational speed of the rotating member, the rim radius of the rotating member, and the height through which the resultant droplets free fall through air to be cooled thereby.

DESCRIPTION OF THE DRAWING

FIG. 1 is a partial cross sectional view of the preferred embodiment of the apparatus of this invention for use with heat-meltable or dissolved explosive material.

DESCRIPTION OF THE PREFERRED EMBODIMENTS

Certain commonly used explosive materials, e.g., TNT, Cyclotol, and Composition B, can quite easily be put into free flowing fluid form by being heated to approximately 190° F.-195° F. Substantial quantities of such an explosive can be heated safely, in bulk, in heated vats provided with hot water or steam heating coils. Certain other explosives, notably nitroguanidine, are capable of being dissolved in warm water. The essential apparatus of this invention is a bell-shaped member 10 rotatable about a longitudinal center rotational axis 11 to produce droplets containing molten or dissolved explosive mterial. This apparatus is amenable for use with a variety of explosive compositions known in the prior act, which are fed in a semi-amorphous, molten or slurry state through an inlet conduit or similar means as denoted by arrow E in FIG. 1. Specific differences in the handling of two different illustrative types of explosive materials will be discussed herein below.

As indicated in partial cross section in FIG. 1, a tall chamber 52, having a tapered hopper like base section 54, is provided with a plurality of cold air inlets 66 in its lower regions and a plurality of warm air outlets 68 in its upper regions. At the top of chamber 52 are provided preferably two journal bearings 22 and 24 disposed about vertical axis. Bearings 22 and 24, acting together, provide firm rotating support to a generally cylindrical bell-shaped member 10 open at both ends. In FIG. 1, for convenience, minute details of structure are omitted and bearings 22 and 24 are shown as closely fitting around an upright cylindrical portion 12 of rotating member 10. Cylindrical portion 12 also has mounted around it, preferably between bearings 22 and 24, a pulley 26 which is connected by an endless belt 32 to a pulley 30 of an electric drive motor 28 conveniently mounted at the top of chamber 52. Electric motor 28 is preferably a variable speed explosion-proof electric motor rated according to the anticipated flow rate of explosive through the apparatus, as persons skilled in the art will readily appreciate.

Elongate axially symmetric rotatable member 10 has below its upper first cylindrical portion 12, and contiguous therewith, a generally conical divergent mid-portion 14 which at its lower end is contiguous with a second cylindrical portion 16. The lower end of cylindrical portion 16 is contiguous with a second divergent flared-out generally conical portion 18 which ends in a horizontal rim 20 with a sharp distal edge 21. The upper generally conical portion 14 has a substantial portion thereof inclined at an angle to the rotation axis and, likewise, lower generally conical portion 18 has a substantial portion thereof inclined at an angle to its local vertical.

Although FIG. 1 shows the various portions 12, 14, 16 and 18 as clearly cylindrical or conical, in actuality these portions may blend into each other or form a single contiguous surface with progressively larger diameters from top portion 12 toward lower portion 18, with rim 20 having the largest diameter of the inner surface of rotating member 10.

As may be seen from FIG. 1, operation of drive motor 28, through belt 32, will rotate member 10 about its vertical center axis 11 inside the upper end of elongate generally closed chamber 52. Explosive material, whether in a molten state by heating or dissolved in warm water, as indicated by arrow E, flows from a source thereof (not shown) through pipe 36 via a control valve 42 into the center of rotating member 10. A flow gauge 44 may conveniently be provided with control valve 42 to monitor the flow rate of incoming explosive material. Pipe 36 at its lowest end is bent to have a section 40 oriented horizontally and ending in an orifice 38 close to the inside surface of cylindrical portion 16 of rotating member 10.

In general, the process should be contained in a temperature and humidity controlled environment wherein the humidity is in excess of 60% R.H. and the temperature is between about 60° to 70° F.

It may be desirable under certain conditions, e.g., in very cold weather with a long pipe 36, to provide additional heat to the molten explosive flow E. This may easily be accomplished by providing a controlled flow of hot water, for example, via an inlet pipe 68 to a water jacket 70 surrounding the molten explosive pipe portion proximate rotating member 10, with this heated water flowing back out via an outlet pipe 72.

Chamber 52 is provided with a bottom cover 58, hinged to one side, which may be rotated to an open position 60 as indicated by phantom lines in FIG. 1.

Between explosive inlet pipe 36 and the upper cylindrical portion 12 of rotating member 10 is provided a seal 34, to prevent any inadvertent flow of explosive material from chamber 52 to the vicinity of electric motor 28. This is a safety measure intended to avoid explosions, and also to prevent the introduction of air pollutants to the interior of chamber 10. Seal 34 can have any of several configurtions known to the prior art for such seals between a stationary central member and a coaxially rotating outer member.

Operation of a preferred embodiment of the apparatus of this invention for use with heat melted explosive flow E will now be described.

Chamber 52 is closed at the bottom by closure of cover 58 and cool air vents 66 are opened to allow the ingress of cooling air as indicated by arrows C. Motor 28 is actuated to rotate rotating member 10 at a predetermined controlled speed. At this point, the rotation of the lower conical portion 18 of rotating member 10 will generate air currents tending to flow in an outwardly directed spiral so that air flows downward along the inner surface of chamber 52 and back up again through the central portion thereof and out exit 74 as denoted by arrow A. Explosive material flow E into pipe 36 is now permitted by means of control valve 42, at a rate monitored on gauge 44. Heated explosive material E, which is free flowing in its motlen state, continuously flows through the lower portion 40 of pipe 36 and through orifice 38. Thereafter, the explosive fed from nozzle orifice 38 impacts the inner cylinderial wall surface 45 of portion 16 and is held there momentarily by centrifugal force and then under the combined action of gravitational and centrifugal forces, the explosive forms an elongate moving string in a spiral pattern 46 along the inner surface of cylindrical portion 16 of rotating member 10. The flow eventually reaches lower conical portion 18 and spins off rim 20 as a free flowing spiral.

Depending on the rotational speed of rotating member 10, the diameter of rim 20, and the viscosity of the flowing motlen explosive, this flung-off flow 48 of explosive material will form either a thin sheet, spiraling strands, or small droplets. Persons skilled in the art, with minimal experimentation, can determine which rate of explosive flow E, motor rotational speed, and diameter of rim 20 are appropriate to form the desired size of granular explosive material. Note: Chamber 54 temperature should be about 60°–70° F. and at a relative humidity of 60% RH for the molten material atomization process to proceed effectively. Illustratively, using TNT as the explosive, a range of from 2000 to 4000 pounds per hour for flow rate E, a rotation of from 600 to 3000 RPM for element 10, and a diameter of 7½ inches for rim 20, can be used to produce acceptable droplets for most applications.

As rotation proceeds, the spun off explosive material 48 falls in a spiraling pattern of droplets of amorphous explosive through the air within chamber 52. A free fall through approximately 15 feet of cool air is adequate to cause droplets to congeal into granules of explosive material. These granules of explosive material are then collected in the lower hopper-like tapered protion 54 of chamber 52 to form a granular deposit 56 at the bottom thereof. Once a sufficient deposit 56 has been collected in chamber 52, gate 58 may be opened to permit an outflow 62 of granular material, preferably onto a conventional belt-type conveyor 64 to carry away the granules of explosive material for further packaging and processing as appropriate.

As persons skilled in the art will appreciate, if the apparatus is used continually over a prolonged period of time, it will be necessary to allow a substantial flow of cooling air to remove the heat brought in by the molten explosive. Because heated air has a lower density than cooler air, there will be a natural convection of this warmed air upward through chamber 52, and out through openings 68 into duct 70, as indicated by arrow A. This outflow of hot air A may conveniently be directed through filtering elements or directly to a stack of conventional design (not shown). In practice, therefore, a steady state operating situation can soon be established in which the granular product 62 can be sampled to ensure that its size is within the acceptable range. Any adjustments that have to be made to the flow rate of explosive, rotational speed of motor 28, and the amount of air flowing through chamber 52, can easily be effected by an operator or by preprogrammed computerized controls.

In the event that this apparatus is utilized with a water soluble explosive such as nitroguanidine, the principal difference is that flow 48 off rim 20 will consist of small droplets of warm water containing dissolved explosive material. As the droplets fall in free fall through the cool air within chamber 52, the outside of the drops quickly cools as the result of evaporation therefrom and the explosive material precipitates out as small granules. The collected granules 56 in the lower reaches of chamber 52 will therefore be mixed in with the unevaporated cooled water in the form of a slurry. Then, as persons skilled in the art will readily appreciate, this slurry can be released through gate 58 into a channel leading to a filtering settling tank or continous centrifuge from which the granules can be removed and dried, as is common in many conventional processes. The solvent water is most conveniently recirculated to dissolve more bulk explosive. Evaporation losses from this recycled solvent water will generally be small and are easily replaced as in any conventional recycling sysem. Thus conveyor belt 64 would be replaced by a channel (not shown) leading to a conventional settling tank. Other than obvious differences, of the type discussed above, due to the different types of explosives in question, the apparatus and method are virtually the same.

The apparatus of this invention and its method of use permit the continuous processing of substantial amounts of bulk explosive into granular form of a size that can be easily controlled by parameters such as explosive flow rate, initial drolet temperature, and the rotational speed of motor 28. Seal 34 ensures that no small particles or granules of the explosive material reach the vicinity of electric motor 28 where random electric sparking could cause the explosive to ignite. The method thus provides safe continual operation for high volume throughput of explosive material.

It should be apparent from the preceding that this invention may e practiced otherwise than as specifically described and disclosed herein. Modifications may therefore be made to the specific embodiments disclosed here without departing from the scope of this invention, and such are intended to be included within the claims appended below.

What is claimed is:

1. In an improved method of producing explosive material in granular form, the improvement consisting essentially of:
    a. directing a fluidized explosive in a thin continuous stream against a rotating gas bell-shaped vertically symmetrical element having a top and bottom inner surface,
    b. moving said fluidized explosive by gravity downwardly from said top to bottom inner surface,
    c. flinging said fluidized explosive in the form of droplets into air by means of centrifugal force from said bottom surface,
    d. forming solid granules of said fluidized explosive by free fall through said air, and
    e. continuously collecting said solid granules.

2. The method of claim 1 wherein said fluidized explosive is selected from the group consisting of TNT, cyclotol and composition B directed in fluidized form at about 180° F.

3. The method of claim 1 wherein said fluidized explosive is nitroguanidine dissolved in a solvent.

4. The method of claim 1 wherein said bell-shaped member is rotated between about 600 to 2000 rpm and said bell-shaped element has a bottom surface of about 7.5 in diameter.

5. The method of claim 1 wherein said free fall is at least 15 ft.

6. The method of claim 3 wherein said nitroguanidine and solvent exists at a 1:3 ratio by weight and are maintained initially at 205° F.

* * * * *